United States Patent [19]

Dyer et al.

[11] Patent Number: 4,947,094

[45] Date of Patent: Aug. 7, 1990

[54] OPTICAL GUIDANCE SYSTEM FOR INDUSTRIAL VEHICLES

[75] Inventors: Robert D. Dyer; Eugene A. Eschbach, both of Richland; Jeffrey W. Griffin, Kennewick, all of Wash.; Michael A. Lind, Durham, Oreg.; Erville C. Buck, Eugene, Oreg.; Roger L. Buck, Springfield, Oreg.

[73] Assignee: Battelle Memorial Institute, Richland, Wash.

[21] Appl. No.: 77,701

[22] Filed: Jul. 23, 1987

[51] Int. Cl.$^5$ .............................................. G05D 1/00
[52] U.S. Cl. .............................. 318/587; 364/424.01; 180/168; 180/169
[58] Field of Search ................ 180/168, 169, 167; 318/577, 587, 580; 364/424, 434, 424.01, 424.02, 424.03, 447, 449

[56] References Cited

U.S. PATENT DOCUMENTS

| | | | |
|---|---|---|---|
| 3,738,443 | 6/1973 | Kubo | 318/587 |
| 4,043,418 | 8/1977 | Blakeslee | 180/168 |
| 4,456,088 | 6/1984 | Nishiki et al. | 318/587 |
| 4,613,804 | 9/1986 | Swenson | 318/587 |
| 4,665,489 | 5/1987 | Suzuki et al. | 318/587 |
| 4,711,316 | 12/1987 | Katou et al. | 180/168 |

Primary Examiner—William M. Shoop, Jr.
Assistant Examiner—David Martin
Attorney, Agent, or Firm—Joseph J. Hauth; Robert K. Sharp

[57] ABSTRACT

An automatically guided vehicle system for steering a vehicle. Optical sensing detects an image of a segment of track mounted above the path of the vehicle. Electrical signals corresponding to the position of the track are generated. A control circuit then converts these signals into movements for the steering of the vehicle.

10 Claims, 7 Drawing Sheets

Optical Guidance Concept Based on Linear CCD Array

For a Truck Lateral Movement, $\Delta L$, Track Image Moves $\Delta l$ Where $$\Delta l = \Delta L \; \frac{D_2}{D_1}$$

Pixel "O"    Target Width Gives Track Range "R"    Pixel "N"

Replacement of Antenna with Optical Guidance System

OPTICAL GUIDANCE SYSTEM FOR INDUSTRIAL VEHICLES

BACKGROUND

Current methods of directional control of automated guided vehicles generally rely on tracking an electromagnetically radiating wire buried in the factory or warehouse floor. This wire emanates a low frequency (less than 10 KHz) electromagnetic signal which is received by an antenna (or antennas) installed on the end(s) of the truck. Via a differential sensing scheme, the guidance control control attempts to maintain the truck centered on the floor wire. A schematic representation of this type of guidance system appears in FIG. 1. In a given factory installation, there may be numerous track wires, each operating at a different frequency to allow alternative steering paths over the floor area. End points and path junctures are generally sensed with truck-mounted magnetic reed switches. Permanent magnets are buried in the floor at juncture points to activate these switches.

The current wire-based guidance systems have inherent shortcomings. These shortcomings arise primarily from the requirement that the wire be buried in the factory or warehouse floor. This operation necessitates cleaning the concrete, marking the wire layout, cutting slots for the wires, installing the wires, sealing the slot with epoxy, and testing the system for continuity. This methodology is labor intensive, expensive, and is not amenable to alteration without a major effort. Also, since AGV technology is generally linked to flexible manufacturing systems, this inherent lack of adaptability is a major shortcoming. If the installation is in an existing warehouse, the task becomes even more difficult (and expensive) since the installation must usually be performed concurrent with normal warehousing operations.

SUMMARY OF THE INVENTION

The AGV optical guidance system according to this invention represents a significant technical departure from current wire-based guidance methods. In this concept, the truck tracks a ceiling-mounted on other overhead optical target strip installed parallel to the desired route. Tracking is accomplished via a vehicle-mounted optical sensing/control system. Truck position relative to the track is sensed by imaging the track onto a linear charge coupled device (CCD) array. Lateral truck coordinates are calculated by processing the CCD pixel output using one of several simple analysis algorithms. The coordinates are used to derive steering correction signals to the truck steering servo. Steering compensation for floor tilt is provided by a truck-mounted inclinometer. A conversion electronics subsystem provides the interface between the optical guidance system and the truck steering system. This subsystem ensures that the appropriate steering signal levels are provided with proper frequency response and damping. In this respect, the conversion electronics subsystem offers a great deal of guidance system flexibility because it facilitates installation and interfacing on a wide variety of AGV's. This AGV optical guidance concept is intended as a "drop-in" replacement for the conventional wire-guidance hardware.

BRIEF DESCRIPTION OF THE DRAWINGS

In the drawings:

FIG. 3b is a diagrammatic illustration of the operation of the CCD array of FIGS. 3 and 3a.

DETAILED DESCRIPTION

Figure 1:
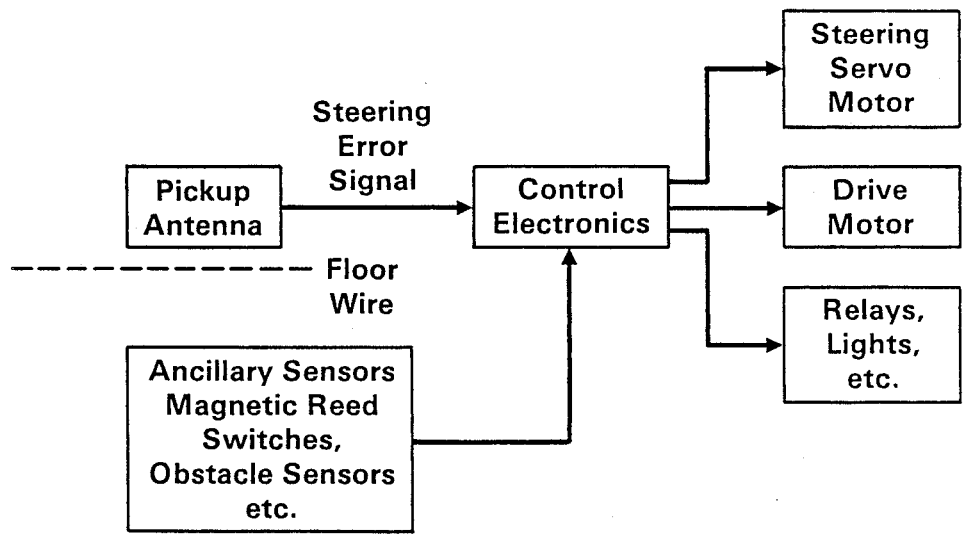
FIG. 1 is a diagrammatic illustration of the wire-guided vehicles of the prior art.
Figure 2:
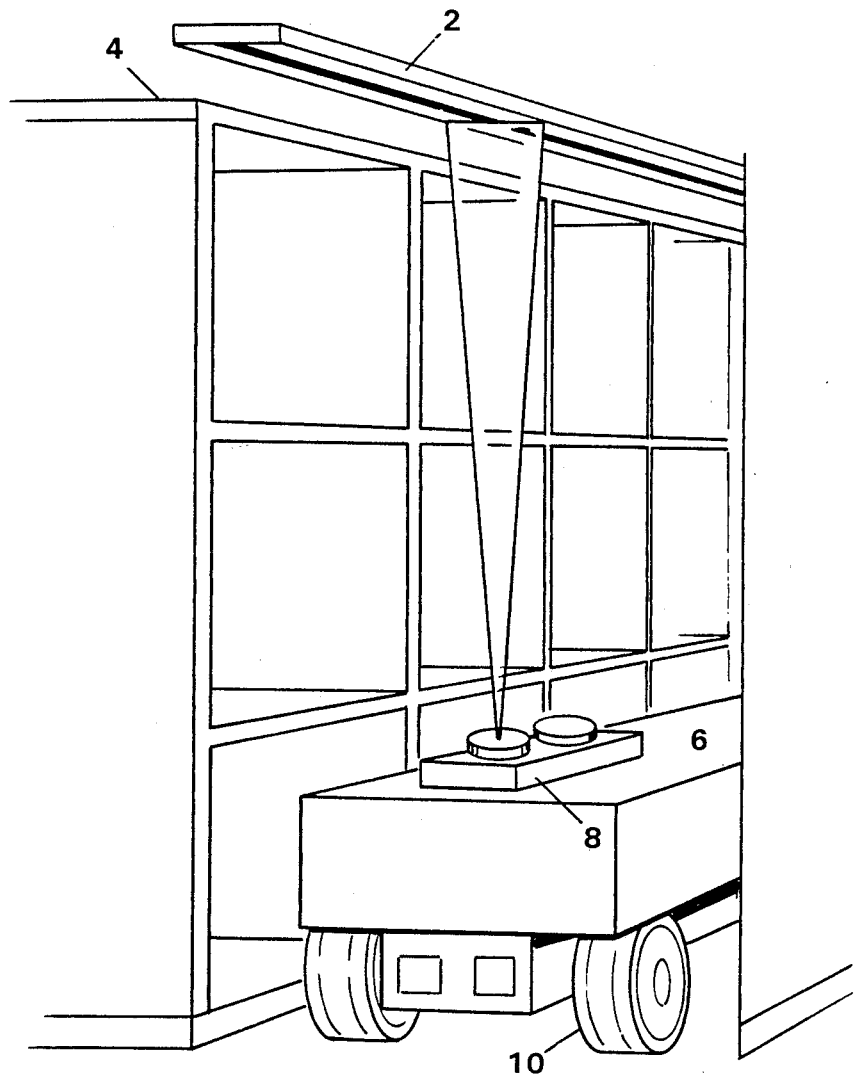
FIG. 2 is a diagrammatic, semi-pictorial illustration of the system of this invention.

Referring to FIG. 2, an overhead track is shown at 2. This track may be mounted on the ceiling; however, there are often advantages to having it supported by the shelves, 4. The vehicle 6, carries an electro-optical system, 8, on its upper surface so that it is exposed to the track, 2. The vehicle is, of course, supported on wheels, 10, at least some of which are steerable.

Various subsySstems will now be described.

THE TRACK

Figure 6:
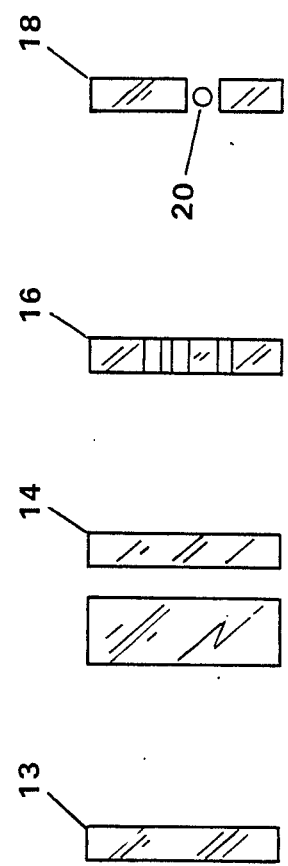
FIG. 6 is a diagrammatic illustration of various passive and partially-passive traCk designs for use in this invention.

The track may be active, passive, or a combination. An active track, as the term is used herein, is a track which itself emits light which is sensed and utilized by the electro-optical system of the vehicle. A passive track is one which is illuminated and reflects light which is so sensed and utilized. Several forms are illustrated in FIG. 6. Passive tracks are illustrated at 12, 14, and 16. They are preferably made of retroreflective material, though diffuse reflecting material, such as painted stripes, may be used. A single element track, which is the simplest form, is shown at 12. An asymmetric track, 14, may be preferable to allow sensing of vehicle orientation. Vehicle position along the track may be encoded by the use of simple bar codes, 16, which are readily sensed by a CCD array forming part of the electro-optical system, as will be described later.

Figure 7:
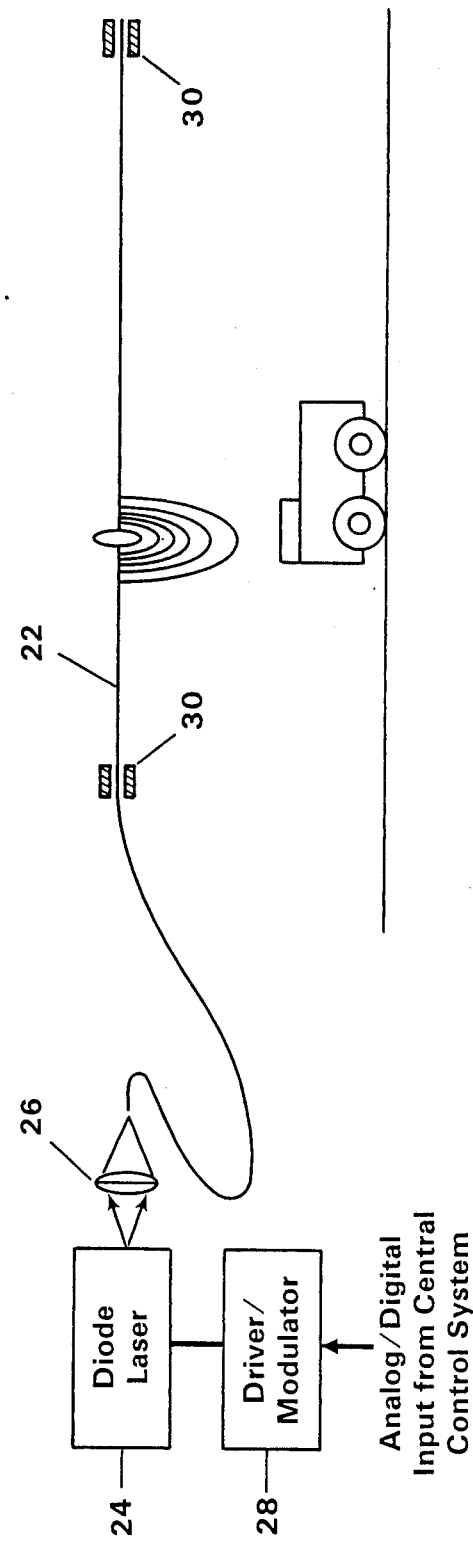
FIG. 7 is a diagrammatic illustration of an active track for use in this invention.

An optically active track and its relation to the vehicle are shown in FIG. 7. It is based on the use of a "lossy" fiber waveguide, 22, i.e., one which has a substantial lateral loss of light, so that it "glows". It is illuminated by a diode laser, 24, assisted by a lens, 26, and controlled by a driver/modulator, 28. The fiber, 22, is supported by mounts, 30, which, like those previously mentioned, may be supported by the ceiling or by shelves or cabinets lining the path of the vehicle.

In some cases it may be desireable to implement an active track section, as shown. In these sections, the passive retroreflector material is partially or totally removed and replaced by modulated light emitting diodes, 20, which transmit instructions to the truck-mounted optical system. This capability would allow remote reprogramming of the truck guidance instructions. Technical aspects of the reflective track concept are enumerated below.

1. The track may be optically passive or partially optically active.
2. The passive track is made of retro-reflective material.
3. The track may be illuminated by infrared light projected from the truck-mounted optical system.
4. The track is oriented parallel to the desired truck path.
5. The track can be a single line or multiple lines.
6. In the multiple line track, the lines can be different widths.
7. Track width(s) are determined by: (a) the separation distance between the truck and track; (b) the magnification of the truck-mounted optical system; (c) the length of the linear CCD array detector element; and (d) the maximum possible lateral motion (e.g., warehouse aisle width) of the truck.

THE ELECTRO-OPTIC SYSTEM

Figure 3:
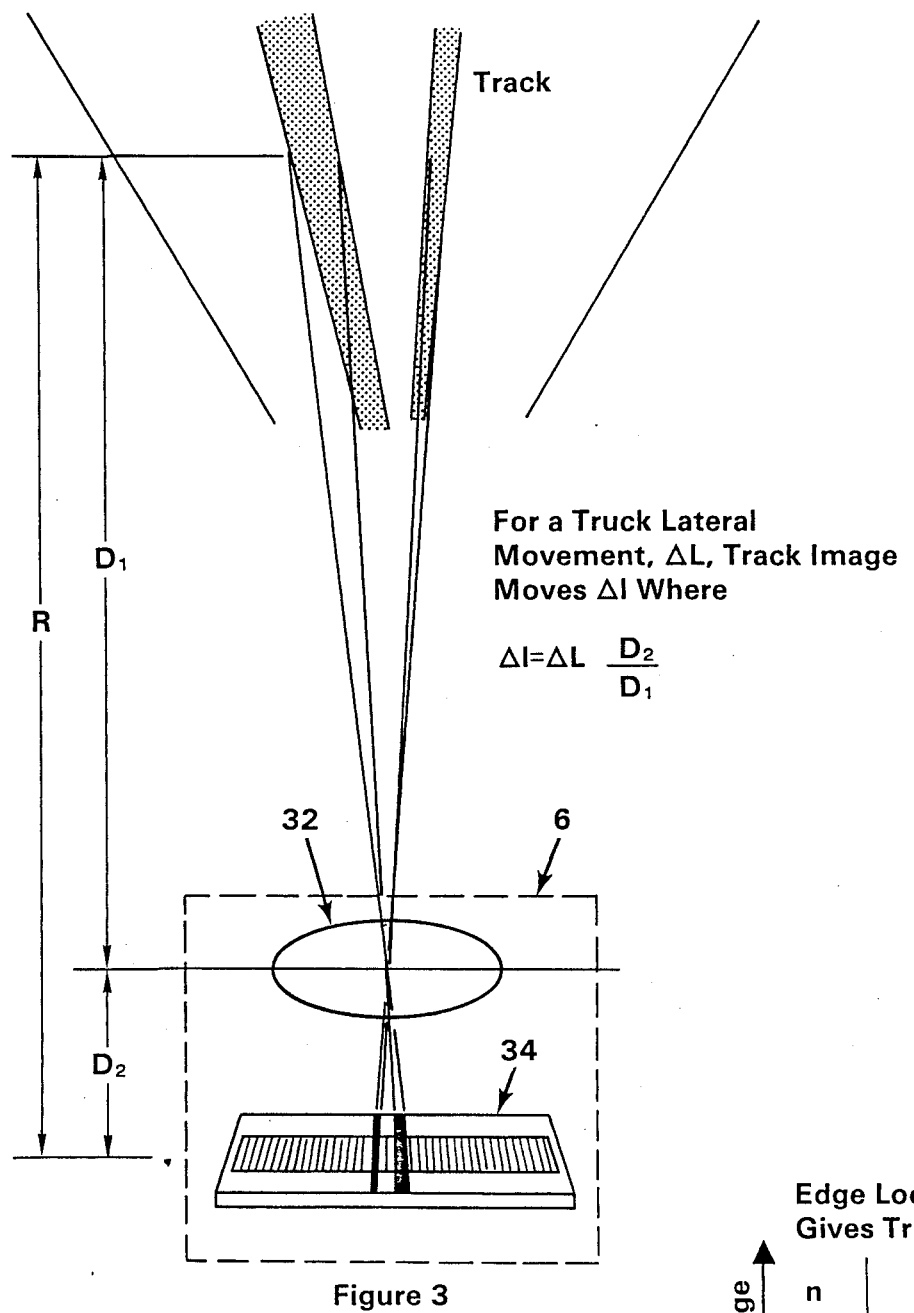
FIG. 3 is a diagrammatic illustratign of a guidance system in accordance for this invention based on a linear charge-coupled device array.
Figure 3A:
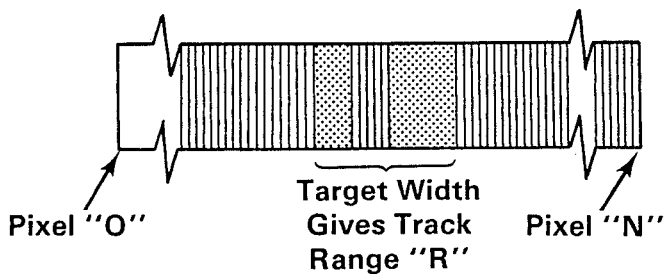
FIG. 3a is a diagrammatic enlargement of the CCD array of FIG. 3.
Figure 3B:
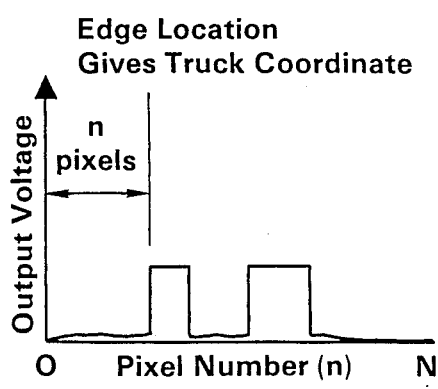
Figure 8:
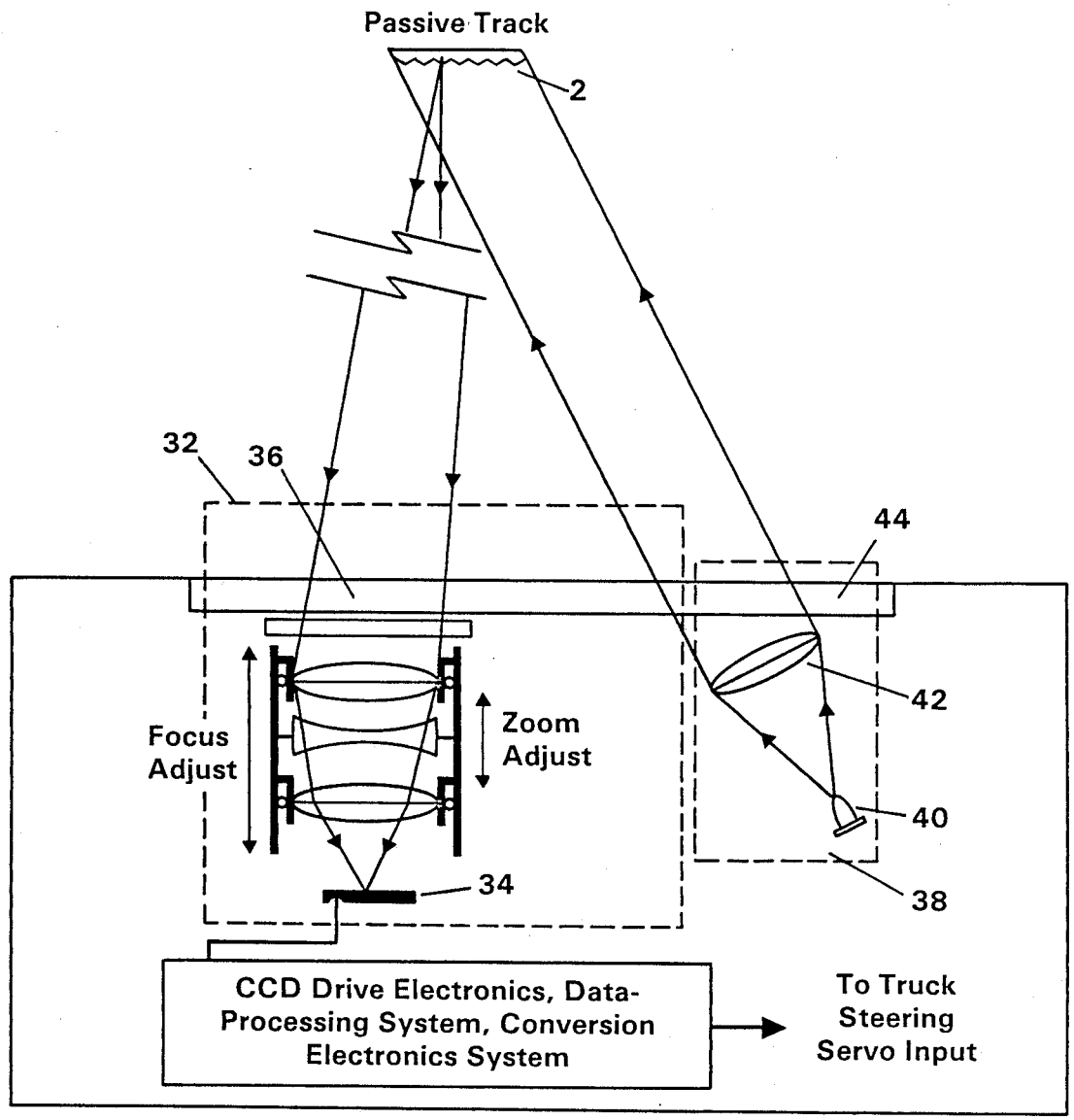
FIG. 8 is a diagrammatic illustration of an electro-optic system for the passive track.

The truck-mounted electro-optic system is comprised of the imaging optics, the CCD array and drive electronics, and the track illumination system (passive track only). A schematic of the electro-optic system appears in FIGS. 3, 3a and 3b. The imaging optics, 32, serve to project an image of the ceiling-mounted track onto the CCD array, 34. The focal length of this optical system is dependent upn the separation distance between the track and truck. It may be desireable to implement zoom capability (i.e., variable focal length) into the optical system to assure guidance system adatpability over a wide range of factory/warehouse environments (variable truck-ceiling spacings). Included in the optical train is a spectral bandpass filter, 36, which allows rejection of backgound lighting and passes only the wavelength range, e.g., 700–800 nm, emitted by the track illumination system (or the optically active track). The linear CCD array 34 is a commercially available device complete with drive electronics. Imaging of the track on this device results in variable illumination levels across the pixel strip as shown in FIG. 3a. Track coordinates (relative to the vehicle) are derived by locating the pixel numbers which the track image traverses (see FIG. 3b). Precise location of the track coordinates may be performed by a number of elementary algorithms including centroiding and simple edge location. The track illumination, 38, (FIG. 8) consists of an infrared (700–800 nm) light emitting diode, 40, and collimation optics, 42. The LED may be operated in either a continuous or pulsed mode (to allow higher peak optical powers). A projective window, 44, transmits the illumination and the reflected light. Technical aspects of the truck-mounted electro-optical system are enumerated below.

1. The entire electro-optical system is contained in a single truck-mounted enclosure.
2. The optical illumination, imaging, and detection components are designed to operate in the 700–800 nm range (near infrared region). This results in excellent rejection of background light due to ceiling-mounted sodium or mercury vapor or fluorescent lights.
3. The optical imaging system may incorporate zoom and focus capability to facilitate guidance system installation in a variety of factory/warehouse environments.
4. The unit is powered by the truck battery bank or a separate battery supply in the case of gasoline/propane/diesel-powered trucks.
5. The linear silicon CCD array/driver is a commercially available unit. The array may have any number of pixel elements. Pixel voltages are output serially. Pixel scan rate is variable and is largely determined by the required steering system time response.
6. The electro-optical system is capable of detecting passive track bar code patterns for path juncture indication or truck motion control (e.g., stopping points).
7. In the passive track configuration, the electro-optical system is capable of bi-directional optical communcation with the central control system via active track elements (optical emitters and detectors). Transmissions from the central control system to the truck are sensed with the CCD array. Transmission from the truck to the central control system performed by the track illumination system.
8. If necessary or desireable, additional optical sources and/or detectors can be added to the truck-mounted electro-optical system to facilitate bi-directional communications with the central control system.
9. For the active track configuration, additional active optical elements (optical emitters and/or detectors) are not necessary on the track. Transmission from the central control system to the truck is accomplished by sensing optical radiation from the "lossy" waveguide with the CCD array.

THE DATA PROCESSING SYSTEM

The ensuing discussion describes a data processing system appropriate fot the AGV shown and described in U.S. Pat. Nos. 4,043,418 and 4,524,314. This vehicle is representative of the class of AGV's for which the ceiling-based optical guidance system is appropriate. The DATA PROCESSING SYSTEM and the CONVERSION ELECTRONICS SYSTEM are the key elements of flexibility in the optical guidance concept. That is, these systems can be readily modified to meet the guidance task at hand from both an AGV hardware (e.g., truck) and factory geometry (e.g., aisle spacing) standpoint. This design aspect offers the potential for widespread use of the overhead optical guidance system with a variety of commercial vechicle designs from a number of manufacturers.

Figure 4:
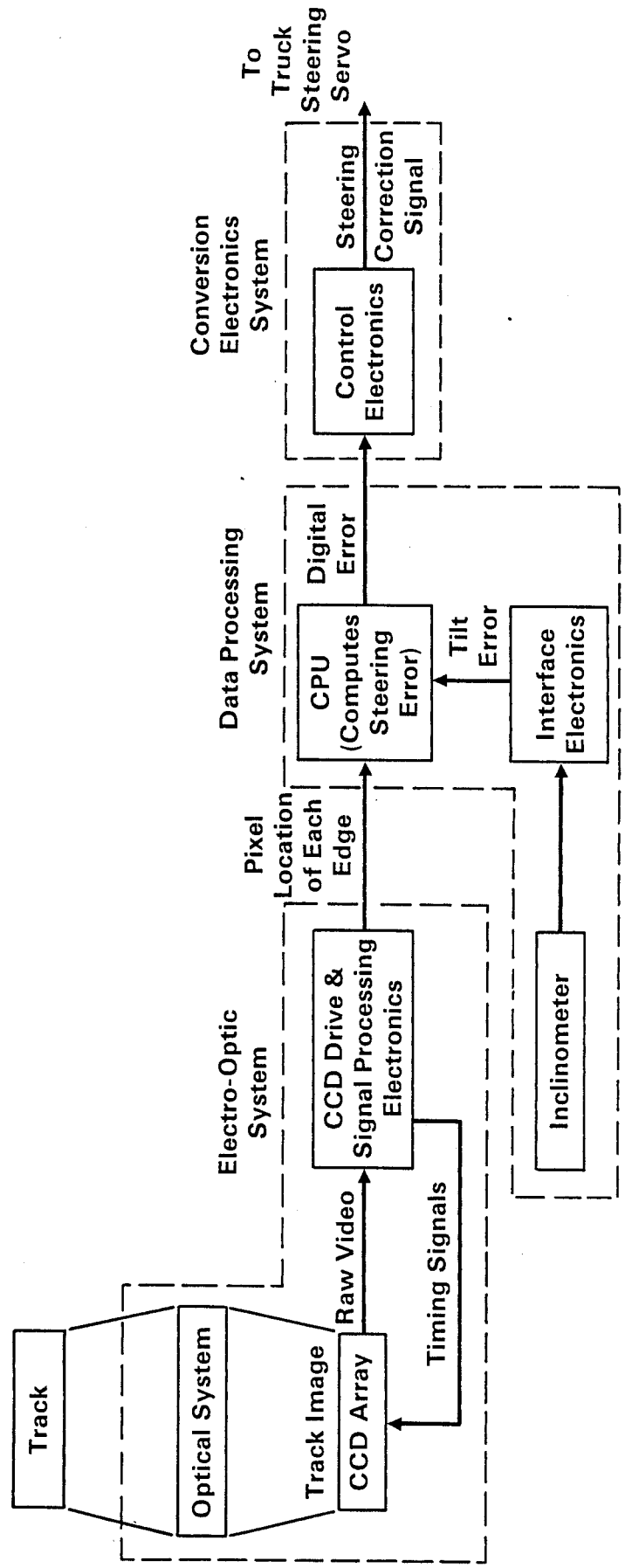
FIG. 4 is a block diagram of the guidance system according to this invention.
Figure 5:
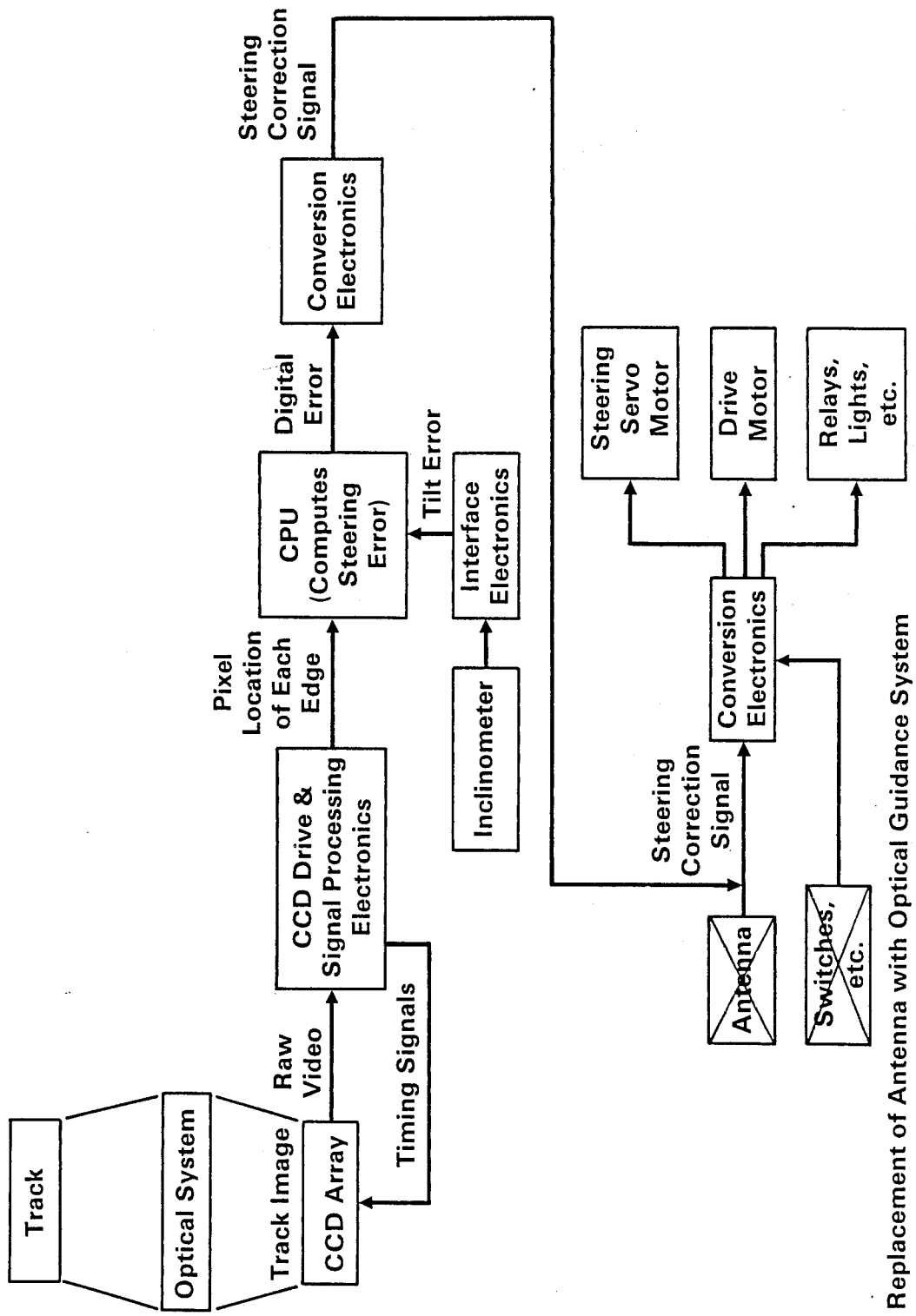
FIG. 5 is a block diagram illustrating an embodiment of the system of FIG. 4 as a "drop-in" replacement for the guidance system employed in FIG. 1.

Referring to FIG. 4, the data processing system: (1) receives truck coordinate input from the CCD array; (2) receives truck tilt information from the inclinometer; (3) computes truck deviation from the desired guide path; and (4) computes a digital error signal which will eventually be processed (by the çonversion electronics system) to derive a steering correction voltage (or current).

As the AGV proceeds along underneath the overhead track, any deviations from the desired path will be sensed as the track image moves from its reference position on the CCD array. When apparent track motion is detected by the data processing system, a digital correction signal is calculated and conveyed to the conversion electronics system. The correction signal is proportional to the deviation from the desired path. This steering correction will bring the AGV back under the track, thereby zeroing the deviation signal.

A microprocessor provides great flexibility in the data processing system. For instance, there my be certain locations within the factory where it would be desireable for two or more AGV's to use the same path on the floor at the same time. This circumstance could arise when one AGV must pass another coming in the opposite direction or when a stopped or disabled AGV occupies the desired path. In these or other cases, the data processing system could steer around the blocked route by computing a lateral offset from the exact path and proceeding around the obstruction. This is not possible with conventional (wire-guided) systems that must follow their guide path with tolerances of less than an inch. Technical aspects of the data processing system are enumerated below.

1. The data processing system uses a 16-bit Intel 80186 microprocessor running at 8 MHz with 512 Kbytes of memory to process the data from the electro-optic system.
2. The data processing system uses a basic edge detection algorithm.
3. The data processing system is capable of implementing more complex target tracking algorithms (e.g., centroiding) if deemed necessary or desirable.
4. Relative track width and stripe separation as measured by the linear CCD array are used to infer the truck-to-track distance. This information along with inclinometer output is necessary to correct for apparent guidance errors induced by floor tilt.

THE CONVERSION ELECTRONICS SYSTEM

The conversion electronics system: (1) acquires the digital correction signal from the data processing system, and (2) converts it to an analog steering control signal appropriate to the truck steering system. Since most commercially available AGV guidance systems are wire-based, it is appropriate to discuss the functional attributes of the conversion electronics subsystem as if it was being used as a replacement for one of these systems. In the existing wire-guided systems, two antennae mounted under the AGV chassis detect the low frequency (<10 KHz) electromagnetic signal from the floor guide wire. The AGV guidance servo attempts to keep the signal amplitudes from these antennae balanced. In a correctly adjusted pickup system, this balance condition is achieved when the guide wire is centered between the antennae. The maintenance of a steering null thus ensures that the vehicle is tracking the guide wire. See, e.g., U.S. Pat. Nos. 4,043,418 and 4,524,314.

In the optical guidance concept, the conversion electronics system synthesizes the AC signals output by the antenna set. This is accomplished with multiplying digital to analog (D/A) converters and a sine wave reference. The amplitude difference between the two AC voltages is maintained proportional to the steering error sensed by the data processing system. Once again, steering lock is assured by matching antennae channel amplitudes. Technical aspects of the conversion electronics system are summarized below.

1. The conversion electronics system is a flexible module capable of synthesizing a range of sinusoidal (and non-sinusoidal) voltage amplitudes consistent with the range(s) anticipated for commercial AGV steering servos.

The embodiments of the invention in which a proprietary right of privilege is claimed are defined as follows:

1. An automatically guided vehicle system comprising:
    a vehicle including at least one steerable wheel;
    a track mounted above said vehicle and parallel to its intended path, said track being constructed and arranged to emit light having a range of wavelengths distinct from the ambient light;
    an optical system on said vehicle constructed and arranged to receive light emitted from said track and project an image of a segment of said track;
    a light-sensitive device positioned to receive said image and constructed and arranged to detect the position of said image;
    means for generating a first electrical signal dependent on said position;
    means for converting said first electrical signal to a steering signal;
    servo means for converting said steering signal into movements of said steerable wheel.

2. A system as defined in claim 1, wherein said track is reflective and is illuminated by light having said wavelengths.

3. A system as defined in claim 2, wherein said track is formed of at least two parallel sub-tracks, said sub-tracks being of different widths.

4. A system as defined in claim 2, wherein said track is longitudinally interrupted by short segments so chosen as to form a bar code.

5. A system as defined in claim 2, wherein said track is interrupted by active light-emitting elements.

6. A system as defined in claim 5, wherein said active light-emitting elements are modulated so as to transmit signals to said optical sytem.

7. A system as defined in claim 1, wherein said track is an active light-emitting elongated element.

8. A system as defined in claim 7, wherein said elongated light-emitting element is an optical wave guide receiving light having said wavelengths at one of its ends.

9. A system as defined in claim 1, wherein said optical system comprises a filter so constructed and arranged as to exclude light other than said wavelengths from said light-sensitive device.

10. A system as defined in claim 1, wherein said light-sensitive device is a linear CCD array.

* * * * *